United States Patent [19]

Kantorski et al.

[11] Patent Number: 4,949,358

[45] Date of Patent: Aug. 14, 1990

[54] RING LASER WITH IMPROVED BEAM QUALITY

[75] Inventors: Joseph W. Kantorski, Southbridge; Klaus Hachfeld, Sturbridge, both of Mass.; James L. Hobart, Los Altos Hills, Calif.

[73] Assignee: Coherent, Inc., Palo Alto, Calif.

[21] Appl. No.: 185,864

[22] Filed: Apr. 25, 1988

[51] Int. Cl.$^5$ .............................................. H01S 3/083
[52] U.S. Cl. ....................................... 372/94; 372/9; 372/101; 372/99; 372/27
[58] Field of Search ................... 372/94, 92, 27, 9, 93, 372/101, 33, 99; 350/405

[56] References Cited

U.S. PATENT DOCUMENTS

| | | | |
|---|---|---|---|
| 4,194,168 | 3/1980 | Jarrett et al. | 372/94 |
| 4,656,433 | 4/1987 | Franklin et al. | 372/27 |
| 4,656,635 | 4/1987 | Baer et al. | 372/27 |
| 4,671,624 | 6/1987 | Kahan | 350/405 |

OTHER PUBLICATIONS

A. R. Clobes et al., "Single-Frequency Traveling-Wave Nd:YAG Laser," Applied Physics Letters, vol. 21, pp. 265-267 (1972).
W. Koeschner, *Solid-State Laser Engineering*, Springer-Verlag New York, Inc., 1976, pp. 200 and 344-365.
W. C. Scott, "Birefringence Compensation and TEM$_{00}$ Mode Enhancement in a Nd:YAG Laser," Applied Physics Letters, vol. 18, No. 1, pp. 3-4 (1971).

*Primary Examiner*—Léon Scott, Jr.
*Attorney, Agent, or Firm*—Limbach, Limbach & Sutton

[57] ABSTRACT

A rod laser having a ring cavity configuration, and including a polarization rotator to compensate for birefringence of the laser's rod. Preferably, the rotator is a 90° crystal quartz rotator. In a preferred embodiment, the ring laser is a stable quasi-unidirectional, non-confocal solid state ring laser. A telescope, including at least two lenses with variable inter-lens spacing, is preferably positioned in the laser beam path as closely as possible to the laser rod. The spacing between the telescope lenses is preferably controlled by a servo mechanism. In a preferred embodiment, a power density detector is provided for producing a beam power signal, and a means (which may include a microprocessor) coupled to the power density detector generates a servo mechanism feedback control signal from the beam power signal. Since the system of the invention maintains a high quality output beam having low far-field beam divergence and small laser beam focal spot diameter, over a wide and varying range of output beam power, the output beam is particularly useful for such applications as high speed drilling, welding, and cutting.

13 Claims, 4 Drawing Sheets

RING LASER WITH IMPROVED BEAM QUALITY

Field of the Invention

The invention relates to rod lasers having a ring cavity configuration. More particularly, the invention relates to rod lasers having a ring cavity configuration, and including means for compensating for output beam optical distortions due to thermal focal lensing, rod birefringence, and spherical aberration.

BACKGROUND OF THE INVENTION

Throughout this Specification, the phrase "ring laser" will denote a rod laser having a ring cavity configuration, the phrase "YAG rod laser" will denote any solid state laser rod (e.g., a Nd:YAG laser rod), and the phrase "YAG ring laser" will denote any ring laser resonator including a solid state laser rod (e.g., a ring laser resonator including a Nd:YAG rod). One convenient parameter that will be used in the Specification for describing the quality of a laser output beam is: $M = (\pi/4L)(2B)(2W)$, where L is the laser wavelength, 2B is the full angle far-field beam divergence, and 2W is the laser beam focal spot diameter.

Rod lasers have been employed in a variety of commercial applications. YAG ring lasers (of the type including a Nd:YAG rod) have been proposed, for example in A. R. Clobes, et al., "Single-frequency Traveling-wave Nd:YAG Laser," Applied Physics Letters, Vol. 21, pp. 265–267, (1972).

For many applications, such as drilling and cutting, it would be desirable to produce a high power, high quality output beam from a laser. Such an output beam would preferably have not only high power but also low far-field beam divergence and low laser beam focal spot diameter.

However, for a number of reasons it is difficult to produce such a high power, high quality output beam. An important reason why it is difficult to produce a high power, high quality output beam is that the quality of a laser output beam is dependent upon the power dissipated in the laser rod. The power dependent phenomena of thermal focal lensing, rod birefringence, and thermally dependent rod end curvature (resulting in spherical and non-spherical aberration) all contribute to the power dependence of beam quality by affecting the laser rod focal length. Several techniques have been proposed for compensating for the effect of individual ones of these phenomena on the output beam quality of linear rod lasers, in contrast with ring lasers.

For example, to compensate for rod birefringence in a YAG rod laser having linear cavity configuration, it has been proposed that a 90° quartz rotator be inserted between two collinear YAG rods in the linear cavity. See W. C. Scott, "Birefringence Compensation and $TEM_{00}$ Mode Enhancement in a Nd:YAG Laser," Applied Physics Letters, Vol. 18, No. 1, pp. 3–4 (1971). This technique relies on the fact that the effect of birefringence induced by one rod will be cancelled by the other rod. However, the technique has the disadvantage that it requires use of two appropriately aligned rods in a linear resonator.

In order to compensate for thermal focal lensing, it has been proposed that an intra-cavity telescope, consisting of a pair of lenses with variable inter-lens spacing, be included in the beam path of a rod laser. As the output beam power (and hence the power dissipated in the rod) varies, the spacing between the lenses of the telescope is varied to compensate for thermally induced variation in the rod focal length. It is conventional to employ a servo positioning mechanism to vary the telescope lens spacing. Measured signals indicative of output beam power have been used as feedback signals for such servo positioning mechanisms.

In order to compensate for thermally dependent rod focal power, inclusion of a positive spherical lens in a linear rod laser beam path (to partially compensate for spherical aberration) has been proposed. Similarly, inclusion of a tilted thin planoconvex lens in a linear rod laser beam path to compensate for astigmatism has been proposed. See W. Koechner, *Solid-State Laser Engineering*. Springer-Verlag New York Inc, 1976, pp. 364–365.

The present invention is a ring laser capable of producing a high quality output beam over a wide and varying output power range, without the need for more than one laser rod, and with enhanced laser system component lifetime.

SUMMARY OF THE INVENTION

The invention is a ring laser including a polarization rotator to compensate for birefringence of the laser's rod. Preferably, the rotator is a 90° crystal quartz rotator. In a preferred embodiment, the ring laser of the invention is a stable, quasi-unidirectional, non-confocal solid state ring laser. An intra-cavity telescope, including two or more lenses with variable inter-lens spacing, is preferably positioned as closely as possible to the laser rod.

The spacing between the telescope lenses is preferably controlled automatically by a servo mechanism. The feedback signal for the servo mechanism is produced by a power density meter or a collimation detector. The spacing between the telescope lenses may alternatively be controlled manually. The telescope lenses are preferably shaped to compensate for spherical aberration induced by the laser rod.

The invention maintains a high quality output beam (having low far-field beam divergence and small laser beam focal spot diameter) over a wide range of output beam power. The output beam is particularly useful for such applications as high speed drilling, welding, and cutting.

BRIEF DESCRIPTIONS OF THE DRAWINGS

DETAILED DESCRIPTION OF THE PREFERRED EMBODIMENTS

Figure 1:
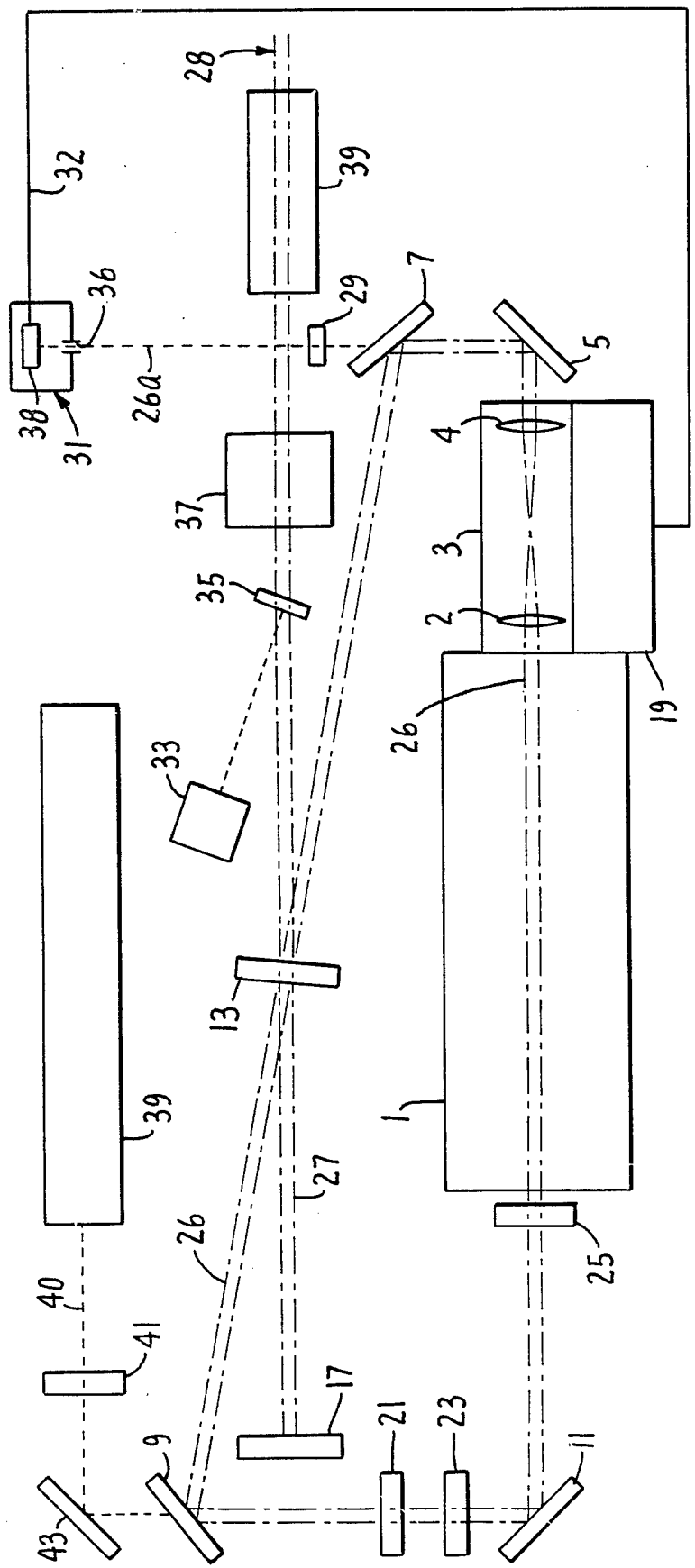
FIG. 1 is a plan view of a preferred embodiment of the invention.

FIG. 1 is a plan view of a preferred embodiment of the invention. Rod 1 is powered in a conventional manner so as to produce laser beam 26. Mirrors 5, 7, 9, and 11 direct laser beam 26 along a ring-shaped path. Apertures (such as apertures 23 and 25) may optionally be included between pairs of mirrors 5, 7, 9, and 11 to define the path of beam 26, and to constrain the energy in beam 26 to propagate in a desired mode. Each of mirrors 5, 9, and 11 preferably has maximal reflectivity at the laser wavelength. Mirror 7 preferably has high reflectivity, but is capable of transmitting a relatively small fraction of the laser light incident thereon. The output beam 28 is diverted from the ring by partially reflective mirror 13.

By appropriately positioning and orienting partially reflective mirror 13 and maximally reflective mirror 17, laser beam 26 is rendered quasi-unidirectional, with most of its power propagating in a counter-clockwise direction. A first portion of the counter-clockwise component of beam 26 is reflected by mirror 13 toward partially reflective mirror 35, and a second portion of the counter-clockwise component of beam 26 is transmitted from mirror 7 through mirror 13 toward mirror 9. Such first portion comprises a major component of output beam 28. A first portion of the clockwise component of beam 26 (identified by reference numeral 27) is reflected by mirror 13 toward mirror 17, and is reflected by mirror 17 back towards mirror 13. Upon arrival at mirror 13, part of the reflected beam from mirror 17 is reflected by mirror 13 back towards mirror 9, and the remainder propagates through mirror 13 to comprise part of output beam 28. The remaining portion of the clockwise component of beam 26 is transmitted from mirror 9 through mirror 13 toward mirror 7. Typically, the counter-clockwise component of beam 26 includes the major portion of the total beam power.

The solid state ring laser of the invention is preferably operated as a stable, quasi-unidirectional, non-confocal laser, although in alternative embodiments it may lack one or more of these three characteristics. For example, the ring laser of the invention may be operated in a regime in which it is unstable or confocal. For another example, the mirrors of the invention may be selected and positioned so that substantially half the power in beam 26 propagates clockwise and substantially half the power in beam 26 propagates counter-clockwise.

Visible laser beam 40 emerges from helium-neon laser 39, propagates through aperture 41, reflects from mirror 43, and propagates through mirror 9 so as to combine with beam 26. Addition of a visible component into beam 26 is useful for checking the alignment of the ring laser system components with which beam 26 interacts.

A minor portion of output beam 28 is reflected in partially reflective mirror 35 to output beam power measurement unit 33. The major portion of output beam 28 propagates through mirror 35 and shutter 37 into optical telescope 39. Mirror 35, power detector 33, optical telescope 39, and shutter 37 may be omitted in variations on the FIG. 1 embodiment. Unit 39 may be selected from commercially available optical telescope units capable of varying the far-field divergence and focal spot diameter of output beam 28.

The focal length of rod 1 will vary with the power dissipated therein (and hence with the power in beam 26 emerging from rod 1). Intra-cavity telescope 3 is disposed adjacent rod 1 (preferably as closely as possible to rod 1) to compensate for this thermal focal lensing effect. Telescope 3 includes lenses 2 and 4, which are mounted so that their relative separation is variable. Servo control unit 19 is mechanically coupled to telescope 3 so that unit 19 may control the relative separation of lenses 2 and 4 of telescope 3. Although telescope 3 in FIG. 1 includes only two lenses, it is specifically contemplated that a telescope including more than two lenses may be substituted for telescope 3, provided that the spacing between at least one pair of lenses in such an alternative telescope is variable.

Power density meter 31 supplies a measured signal indicative of the power of beam 26 to control unit 19 on line 32. In one embodiment, power density meter includes aperture 36 and light detector 38. A fraction of beam 26 (identified as beam portion 26a in FIG. 1) propagates from mirror 5 through partially reflective mirror 7, converging lens 29, and aperture 36 to detector 38. The focal length of lens 29 is chosen so that if beam 26 (and hence beam 26a) is perfectly collimated, then lens 29 will focus beam 26a so that beam 26a has its smallest diameter when it passes through aperture 36. Thus, when beam 26 is perfectly collimated, detector 38 will send an output signal on line 32 indicating maximum incident power at detector 38. However, when beam 26 (and hence beam 26a) is not perfectly collimated, and is instead diverging or converging, aperture 36 will block a greater portion of beam 26a (then in the case that beam 26a is perfectly collimated), and so detector 38 will send an output signal on line 32 indicating less than maximum incident power.

Control unit 19 includes conventional means for controlling telescope 3 in response to the measured power signal received from detector 38 on line 32. Control unit 19 will not cause a change in the spacing between lenses 2 and 4 when beam 26a is collimated, but will increase or decrease the spacing between lenses 2 and 4 when detector 38 indicates that beam 26a is not collimated.

In an alternative embodiment, the measured power signal supplied from detector 38 on line 32 may be displayed rather than supplied to a control unit 19. In such alternative embodiment, a human operator would then manually control the spacing between lenses 2 and 4 of telescope 3 in response to the magnitude of the displayed power signal.

Polarization rotator 21 (which preferably is a crystal quartz rotator) is mounted along the path of beam 26 to compensate for the effect of thermal birefringence of rod 1 on beam 26. Such effect results essentially in different focal lengths for radially polarized light and tangentially polarized light emerging from rod 1. Rotator 21 rotates the polarization of both the radial and tangential components of beam 26 by an angle selected to equalize the effect of rod 1's thermal birefringence on beam 26. Rotator 21 will preferably be a 90° rotator, in the sense that it the polarization of beam 26 by an angle substantially equal to 90 degrees. However, rotator 21 may alternatively rotate the polarization of beam 26 by an angle substantially equal to 270 degrees or 450 degrees, or more generally, by an angle substantially equal to $[90+(N)(180)]$ degrees, where N is a positive integer.

The effect of rotator 21 may be understood by considering that the photons comprising beam 26, on the average, traverse the ring defined by mirrors 5, 7, 9, and 11 at least twice (i.e., twice as opposed to once). Thus, the first time the components of beam 26 traverse the ring, they will have a first polarization relative to rod 1, and the second time those components of beam 26 traverse the ring, they will have a second polarization relative to rod 1. Preferably, the first and second polarizations differ by an angle substantially equal to 90°, so that each component of beam 26 that is radially polarized the first time it traverses rod 1 will be tangentially polarized the second time it traverses the same region within rod 1. In this way, the thermal birefringence effects on radial and tangential focal lengths developed in the first pass through rod 1 can be equalized by a second pass through rod 1.

Polarization rotator 21 preferably comprises crystal quartz (in contrast with fused quartz), and preferably comprises crystal quartz of the type absorbing as little light as possible. Typically, commercially available synthetic crystal quartz will absorb less light than will natural crystal quartz. In alternative embodiments of the invention, other means for rotating the polarization of beam 26 may be substituted for a crystal quartz rotator. For example, rotator 21 may be a Faraday rotator, preferably of the type capable of rotating the polarization of beam 26 by an angle substantially equal to 90°.

Figure 2:
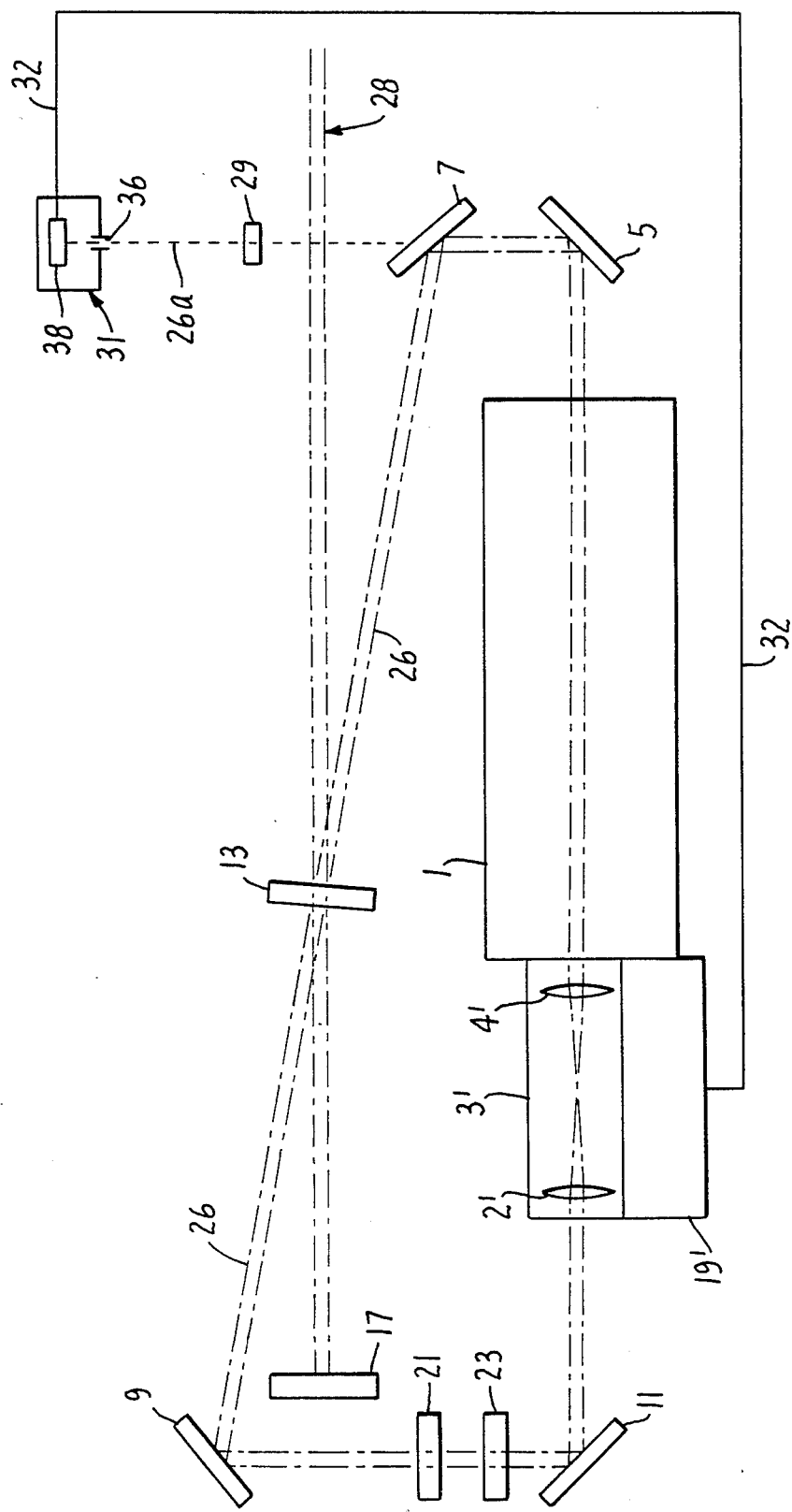
FIG. 2 is a simplified plan view of another preferred embodiment of the invention.

FIG. 2 is a simplified plan view of another embodiment of the invention. Rod 1, mirrors 5, 7, 9, 11, 13, and 17, rotator 21, aperture 23, converging lens 29, and power density meter 31 are identical to the corresponding elements of the FIG. 1 system. As in the FIG. 1 system, most of the power in beam 26 propagates in the counter-clockwise direction, and output beam 28 propagates toward the right. Thus, beam 26 has lower power in the left portion of the ring (between mirror 9 and the left end of rod 1) and higher power in the right portion of the ring (from the right end of rod 1 counter-clockwise to mirror 13).

Telescope 3' corresponds to telescope 3 of FIG. 1, but is positioned in the low power portion of the FIG. 2 ring whereas telescope 3 is positioned in the high power portion of the FIG. 1 ring. Telescope 3' is preferably positioned as closely as possible adjacent rod 1. It is advantageous to position both telescope 3', and the other optical components of the system, in the low power portion of the ring (in contrast with the high power portion) in order to maximize the lifetime of these components. Control unit 19' is identical to control unit 19 of the FIG. 1 embodiment, and may be replaced by a display unit for displaying the signal supplied on line 32 (as described above with reference to FIG. 1).

Each of telescope lenses 2' and 4' in the FIG. 2 embodiment (and telescope lenses 2 and 4 in the FIG. 1 embodiment) is preferably selected to have a shape that will compensate, at least partially, for the spherical aberration introduced by rod 1. Compensation for such spherical aberration will further improve the system's output beam quality.

In both the FIG. 1 and FIG. 2 embodiments, means are preferably provided for oscillating aperture 36 at high frequency in directions parallel to beam 26a (i.e., for imparting "jitter" to aperture 36 parallel to the axis of beam 26a). This high-frequency oscillation increases the stability of the control signal generated in servo control unit 19 (or 19') and allows unit 19 (19') to more rapidly compensate for variations in the power and divergence of beam 26a.

Element 31 (including components 36 and 38) thus comprises a power density detector for producing a beam power signal, which may be supplied on line 32 to servo control unit 19 or 19'. Servo control unit 19 (and 19') preferably includes a microprocessor for generating the feedback control signal for the telescope from the beam power signal.

Figure 3:
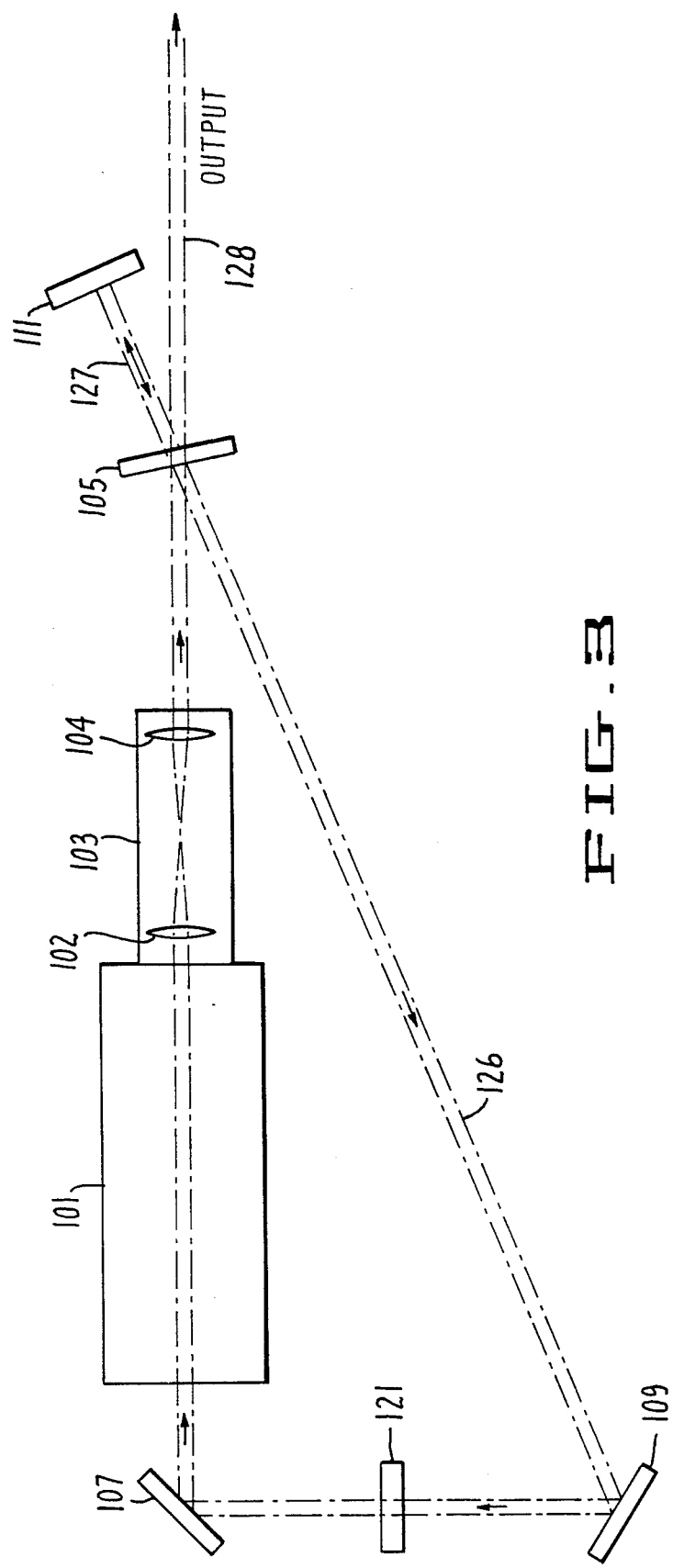
FIG. 3 is a schematic view of an alternative embodiment of the invention.

FIG. 3 is a schematic diagram of an alternative embodiment of the invention. FIG. 3 indicates that the features of the invention discussed above with reference to FIGS. 1 and 2 may also be embodied in other ring laser systems having alternative ring resonator configurations and different numbers of mirrors. In FIG. 3, the ring cavity is triangular and is defined by three mirrors 105, 107, and 109 (unlike the ring cavity in FIGS. 1 and 2, which is quadrilateral, and is defined by four mirrors 5, 7, 9, and 11). Mirrors 107 and 109 are preferably maximally reflective, and mirror 105 is partially reflective.

By appropriately positioning and orienting mirror 105 and maximally reflective mirror 111, laser beam 126 is rendered quasi-unidirectional, with most of its power propagating in a clockwise direction. A first portion of the clockwise component of beam 126 is reflected by mirror 105 toward mirror 109, and a second portion is transmitted from rod 101 and telescope 103 through mirror 105 to become output beam 128. A first portion of the counter-clockwise component of beam 126 (identified by reference numeral 127) is transmitted through mirror 105 toward mirror 111, and from mirror 111 is reflected from mirror 105 to become part of output beam 128. The remaining portion of the counter-clockwise component of beam 126 is reflected from mirror 105 back toward mirror 107.

The configuration of the FIG. 3 ring laser is convenient because output beam 128 is in-line with laser rod 101. Thus, the FIG. 3 system may readily be mounted on an optical rail or bench. The FIG. 3 configuration also eliminates two mirrors that were required in the FIG. 1 and FIG. 2 embodiments (i.e., the FIG. 3 system requires only four mirrors, 105, 107, 109, and 111, while the FIG. 1 and FIG. 2 systems require six mirrors, 5, 7, 9, 11, 13, and 17).

In FIG. 3, telescope 103 (which includes lenses 102 and 104) and polarization rotator 121 correspond with, and serve the same functions as telescope 3' and rotator 21 in FIG. 2. A servo control unit (not shown in FIG. 3), of any of the types described above with reference to FIGS. 1 and 2, may be coupled with telescope 103 in the FIG. 3 system, to provide a servo control signal for automatically varying the inter-lens separation of telescope 103.

Figure 4:
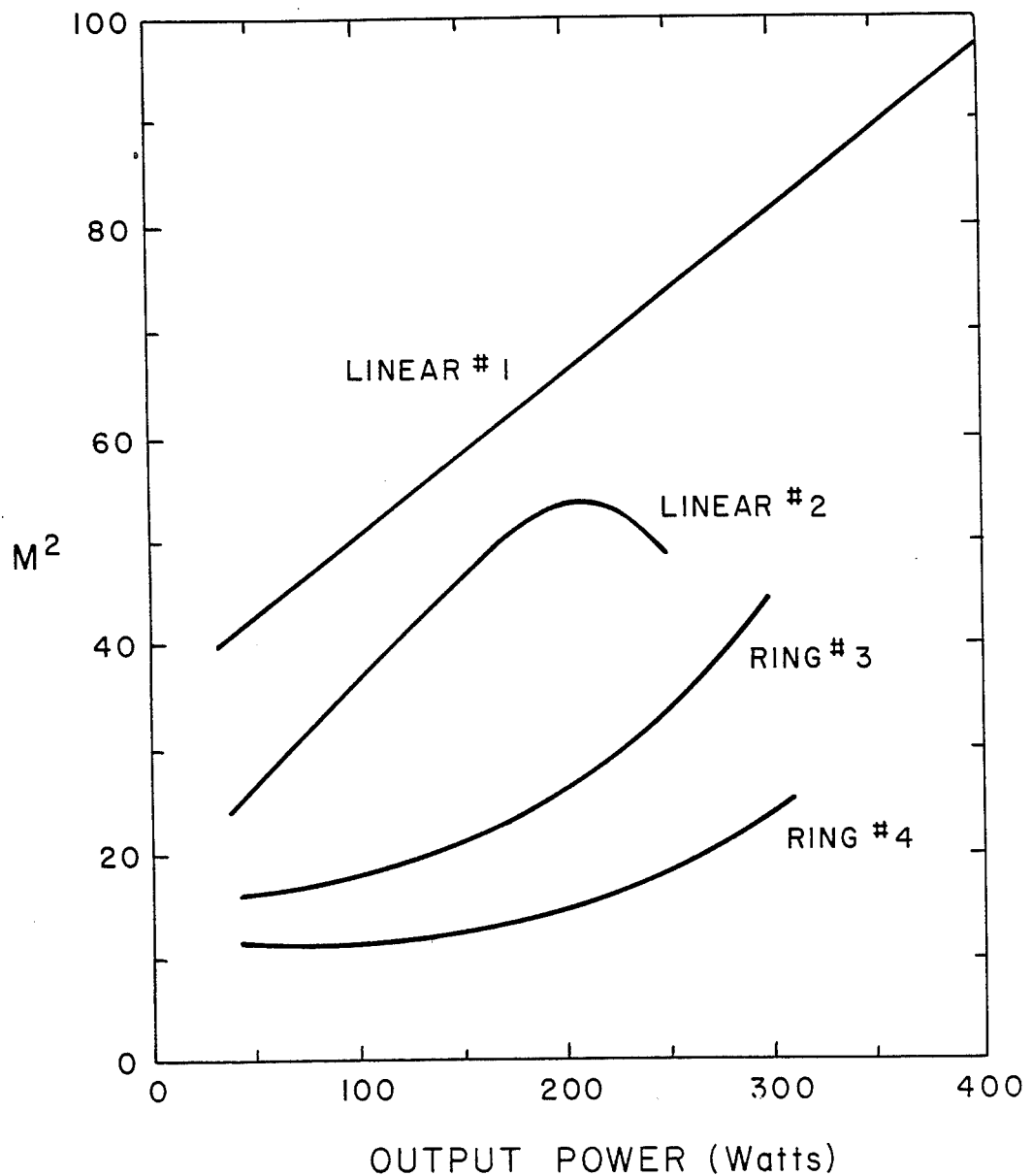
FIG. 4 is a graph of output laser beam quality ($M^2$) versus output beam power for three conventional laser systems and for an embodiment of the invention.

FIG. 4 is a graph representing output laser beam quality $M^2$ versus output beam power for two types of conventional laser systems, and for an embodiment of the invention. The two upper curves represent data, measured by us, characterizing two conventional linear rod lasers. The curve labeled "Ring No. 3" represents data, measured by us, characterizing a conventional rod laser having a ring cavity configuration. The bottom curve, labeled "Ring No. 4", represents data, measured by us, characterizing the FIG. 1 embodiment of the invention. Other measurements have revealed that the FIG. 1 embodiment of the invention has achieved an output laser beam having quality $M^2$ less than 20 over a wide output beam power range from about 50 watts to over 300 watts.

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A ring laser, including:
   a solid-state laser rod positioned along a ring-shaped path;
   a substantially totally reflective first mirror;
   a set of mirrors oriented to cause laser light emerging from the rod to propagate as a beam around the ring-shaped path, said set of mirrors including a partially reflective second mirror having front surface and a back surface, wherein the second mirror is oriented so that laser light incident at the front surface of the second mirror after propagating in a first direction around the ring-shaped path will reflect from the second mirror into an output beam direction away from the ring-shaped path, and wherein the first mirror and the second mirror are oriented so that a first portion of laser light incident at the back surface of the second mirror after propagating in a second direction around the ring-shaped path will propagate through the second mirror and will continue to propagate in the second direction around the ring-shaped path, and so that a second portion of laser light incident at the back surface of the second mirror after propagating in the second direction around the path will reflect from the second mirror toward the first mirror and will then reflect from the first mirror back toward the back surface of the second mirror, and will then propagate through the second mirror into the output beam direction; and a 90° crystal quartz polarization rotator positioned along the ring-shaped path, for rotating the polarization of the laser light propagating along the ring-shaped path by an angle substantially equal to 90 degrees, in order to compensate for thermal birefringence of the rod.

2. A ring laser, including:
a solid-state laser rod positioned along a ring-shaped path;
a substantially totally reflective first mirror;
a set of mirrors oriented to cause laser light emerging from the rod to propagate as a beam around the ring-shaped path, said set of mirrors including a partially reflective second mirror having front surface and a back surface, wherein the second mirror is oriented so that laser light incident at the front surface of the second mirror after propagating in a first direction around the ring-shaped path will reflect from the second mirror into an output beam direction away from the ring-shaped path, and wherein the first mirror and the second mirror are oriented so that a first portion of laser light incident at the back surface of the second mirror after propagating in a second direction around the ring-shaped path will propagate through the second mirror and will continue to propagate in the second direction around the ring-shaped path, and so that a second portion of laser light incident at the back surface of the second mirror after propagating in the second direction around the path will reflect from the second mirror toward the first mirror and will then reflect from the first mirror back toward the back surface of the second mirror, and will then propagate through the second mirror into the output beam direction; and
a polarization rotator positioned along the ring-shaped path, for rotating the polarization of the laser light propagating along the ring-shaped path by an angle substantially equal to $(90+(N)(180))$ degrees, where N is an integer, in order to compensate for thermal birefringence of the rod, wherein the path includes a third portion between the back surface of the second mirror and the rod, and the path has a fourth portion between the front surface of the second mirror and the rod, and wherein the polarization rotator is positioned along the third portion of the path.

3. A ring laser, including:
a solid-state laser rod positioned along a ring-shaped path, wherein the rod has a first end and a second end;
a substantially totally reflective first mirror;
a set of mirrors oriented to cause laser light emerging from the rod to propagate as a beam around the ring-shaped path, said set of mirrors including a partially reflective second mirror having front surface and a back surface, wherein the second mirror is oriented so that laser light incident at the front surface of the second mirror after propagating in a first direction around the ring-shaped path will reflect from the second mirror into an output beam direction away from the ring-shaped path, and wherein the first mirror and the second mirror are oriented so that a first portion of laser light incident at the back surface of the second mirror after propagating in a second direction around the ring-shaped path will propagate through the second mirror and will continue to propagate in the second direction around the ring-shaped path and so that a second portion of laser light incident at the back surface of the second mirror after propagating in the second direction around the path will reflect from the second mirror toward the first mirror and will then reflect from the first mirror back toward the back surface of the second mirror, and will then propagate through the second mirror into the output beam direction;
a polarization rotator positioned along the ring-shaped path, for rotating the polarization of the laser light propagating along the ring-shaped path by an angle substantially equal to $(90+(N)(180)$ degrees, where N is an integer, in order to compensate for thermal birefringence of the rod; and
a telescope, including at least two lenses with variable inter-lens spacing positioned along the path as closely as possible to either end of the rod.

4. The laser of claim 3, wherein the path includes a third portion between the back surface of the second mirror and the first end of the rod, and the path has a fourth portion between the front surface of the second mirror and the second end of the rod, and wherein the telescope is positioned along the third portion of the path adjacent the first end of the rod.

5. The laser of claim 3, also including:
a servo mechanism coupled to the telescope, and capable of controlling the inter-lens spacing of the telescope;
a power density meter for producing a beam power signal from the beam; and
a servo control circuit coupled between the power density meter and the servo mechanism, and including a means for generating a feedback signal for the servo mechanism from the beam power signal.

6. The laser of claim 3, wherein the shape of each telescope lens is selected so that the telescope lenses will at least partially compensate for laser beam spherical aberration introduced by the rod.

7. A ring laser, including:
a solid-state laser rod positioned along a ring-shaped path;
a set of mirrors for causing laser light emerging from the rod to propagate as a beam along a ring-shaped path, said beam including a first component propagating in a first rotational direction along the path and a second component propagating in a second rotational direction along the path;

a partially reflective second mirror positioned so as to divert an output beam portion from the first component of the beam;

a first mirror, positioned relative to the second mirror so that the second mirror will direct a portion of the second component to the first mirror, and so that the first mirror will reflect said portion of the second component in such a direction that the reflected portion of the second component will join the output beam portion, wherein the reflectivity of the second mirror is selected so that the laser beam is quasi-unidirectional, with substantially more of the power in the laser beam propagating in the first component than in the second component; and a polarization rotator positioned along the path, for rotating the polarization of the beam by an angle substantially equal to $(90+(N)(180))$ degrees, where N is an integer, in order to compensate for thermal birefringence of the rod.

8. A ring laser, including:

a solid-state laser rod positioned along a ring-shaped path;

a set of mirrors for causing laser light emerging from the rod to propagate as a beam along a ring-shaped path, said beam including a first component propagating in a first rotational direction along the path and a second component propagating in a second rotational direction along the path;

a partially reflective second mirror positioned so as to divert an output beam portion from the first component of the beam;

a first mirror, positioned relative to the second mirror so that the second mirror will direct a portion of the second component to the first mirror, and so that the first mirror will reflect said portion of the second component in such a direction that the reflected portion of the second component will join the output beam portion; and a 90° crystal quartz polarization rotator positioned along the path, for rotating the polarization of the beam by an angle substantially equal to 90 degrees, in order to compensate for thermal birefringence of the rod.

9. A ring laser, including:

a solid-state laser rod positioned along a ring-shaped path;

a set of mirrors for causing laser light emerging from the rod to propagate as a beam along a ring-shaped path, said beam including a first component propagating in a first rotational direction along the path and a second component propagating in a second rotational direction along the path;

a partially reflective second mirror positioned so as to divert an output beam portion from the first component of the beam;

a first mirror, positioned relative to the second mirror so that the second mirror will direct a portion of the second component to the first mirror, and so that the first mirror will reflect said portion of the second component in such a direction that the reflected portion of the second component will join the output beam portion, wherein the second mirror has a back surface on which the second component is incident, and a front surface on which the first component is incident, and wherein the path includes a third portion between the back surface of the second mirror and the rod, and the path has a fourth portion between the front surface of the second mirror and the rod; and a polarization rotator positioned along the third portion of the path, for rotating the polarization of the beam by an angle substantially equal to $(90+(N)(180))$ degrees, where N is an integer, in order to compensate for thermal birefringence of the rod.

10. A ring laser, including:

a solid-state laser rod positioned along a ring-shaped path, wherein the rod has a first end and a second end;

a set of mirrors for causing laser light emerging from the rod to propagate as a beam along a ring-shaped path, said beam including a first component propagating in a first rotational direction along the path and a second component propagating in a second rotational direction along the path;

a partially reflective second mirror positioned so as to divert an output beam portion from the first component of the beam;

a first mirror, positioned relative to the second mirror so that the second mirror will direct a portion of the second component to the first mirror, and so that the first mirror will reflect said portion of the second component in such a direction that the reflected portion of the second component will join the output beam portion;

a polarization rotator positioned along the path, for rotating the polarization of the beam by an angle substantially equal to $(90+(N)(180))$ degrees, where N is an integer, in order to compensate for thermal birefringence of the rod; and a telescope, including at least two lenses with variable inter-lens spacing positioned along the path as closely as possible to either end of the rod.

11. The laser of claim 10, wherein the second mirror has a back surface on which the second component is incident, and a front surface on which the first component is incident, and wherein the path includes a third portion between the back surface of the second mirror and a first end of the rod, and the path has a fourth portion between the front surface of the second mirror and the second end of the rod, and wherein the telescope is positioned along the third portion of the path adjacent the first end of the rod.

12. The laser of claim 10, also including:

a servo mechanism coupled to the telescope, and capable of controlling the inter-lens spacing of the telescope;

a power density meter for producing a beam power signal from the beam; and a servo control circuit coupled between the power density meter and the servo mechanism, and including a means for generating a feedback signal for the servo mechanism from the beam power signal.

13. The laser of claim 10, wherein the shape of each telescope lens is selected so that the telescope lenses will at least partially compensate for laser beam spherical aberration introduced by the rod.

* * * * *